United States Patent
Choi et al.

(10) Patent No.: US 11,885,249 B2
(45) Date of Patent: Jan. 30, 2024

(54) CATALYST FOR EXHAUST GAS PURIFICATION

(71) Applicant: LG Hausys, Ltd., Seoul (KR)

(72) Inventors: Kyeong-Woo Choi, Seoul (KR); Ha-Na Kim, Seoul (KR); Won-Ji Hyun, Seoul (KR); Dong-Il Lee, Seoul (KR); Ho-Jin Choi, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 253 days.

(21) Appl. No.: 17/274,398

(22) PCT Filed: Jan. 11, 2019

(86) PCT No.: PCT/KR2019/000497
§ 371 (c)(1),
(2) Date: Mar. 8, 2021

(87) PCT Pub. No.: WO2020/050464
PCT Pub. Date: Mar. 12, 2020

(65) Prior Publication Data
US 2021/0239020 A1  Aug. 5, 2021

(30) Foreign Application Priority Data

Sep. 6, 2018 (KR) .................. 10-2018-0106724

(51) Int. Cl.
| | | |
|---|---|---|
| F01N 3/20 | (2006.01) | |
| B01J 21/06 | (2006.01) | |
| B01J 21/04 | (2006.01) | |
| B01J 35/02 | (2006.01) | |
| B01J 35/10 | (2006.01) | |
| B01J 23/38 | (2006.01) | |
| B01J 37/02 | (2006.01) | |
| B82Y 30/00 | (2011.01) | |
| B82Y 40/00 | (2011.01) | |

(52) U.S. Cl.
CPC ............ *F01N 3/20* (2013.01); *B01J 21/04* (2013.01); *B01J 21/066* (2013.01); *B01J 23/38* (2013.01); *B01J 35/023* (2013.01); *B01J 35/026* (2013.01); *B01J 35/1071* (2013.01); *B01J 35/1076* (2013.01); *B01J 37/02* (2013.01); *B82Y 30/00* (2013.01); *B82Y 40/00* (2013.01); *F01N 2250/12* (2013.01); *F01N 2510/0684* (2013.01)

(58) Field of Classification Search
CPC .. F01N 3/20; B01J 21/04; B01J 21/066; B01J 23/38; B01J 35/023; B01J 35/026; B01J 35/1071; B01J 35/1076; B01J 37/02
See application file for complete search history.

(56) References Cited

U.S. PATENT DOCUMENTS

| | | |
|---|---|---|
| 7,977,276 B2 | 7/2011 | Kikuchi et al. |
| 2008/0254978 A1 | 10/2008 | Kikuchi et al. |
| 2010/0234217 A1 | 9/2010 | Ishii |

FOREIGN PATENT DOCUMENTS

| | | | | |
|---|---|---|---|---|
| CN | 101433803 A | 5/2009 | | |
| CN | 102405103 A | 4/2012 | | |
| CN | 103170315 A | 6/2013 | | |
| CN | 104971735 A | 10/2015 | | |
| JP | H07-68176 A | 3/1995 | | |
| JP | 9-192487 A | 7/1997 | | |
| JP | H10-249198 A | 9/1998 | | |
| JP | 2002-119870 A | 4/2002 | | |
| JP | 2004-261681 A | 9/2004 | | |
| JP | 2004261681 A | * 9/2004 | ............ | B01J 23/63 |
| JP | 2005-103410 A | 4/2005 | | |
| JP | 2005103410 A | * 4/2005 | ........... | B01D 53/945 |
| JP | 2007-85242 A | 4/2007 | | |
| JP | 2010-75788 A | 4/2010 | | |
| JP | 2012-187503 A | 10/2012 | | |
| JP | 2013-198879 A | 10/2013 | | |
| JP | 2014-30800 A | 2/2014 | | |
| KR | 10-2008-0092859 A | 10/2008 | | |
| KR | 10-2008-0102272 A | 11/2008 | | |
| KR | 10-2020-0022762 A | 3/2020 | | |
| WO | 2010/096612 A2 | 8/2010 | | |

OTHER PUBLICATIONS

Japanese Office Action dated Apr. 8, 2022, in connection with Japanese Patent Application No. 2021-511553, along with English machine translation.
International Search Report dated May 28, 2019, in connection with corresponding International Patent Application No. PCT/KR2019/000497.
Extended European Search Report dated May 25, 2021, corresponding to European Application No. 19858283.5.
Chinese Office Action dated Feb. 1, 2023, in connection with the Chinese Patent Application No. 201980057618.2, 17 pages, with English machine translation.
Chinese Office Action dated Sep. 28, 2023, in connection with the Chinese Patent Application No. 201980057618.2, 19 pages, with English machine translation.

* cited by examiner

*Primary Examiner* — Yong L Chu
(74) *Attorney, Agent, or Firm* — Hauptman Ham, LLP

(57) ABSTRACT

Provided is a catalyst for exhaust gas purification, the catalyst comprising: a noble metal; an alumina support particle; and a $ZrO_2$ semiconductor support particle deposited on a surface of the alumina support particle.

5 Claims, 1 Drawing Sheet

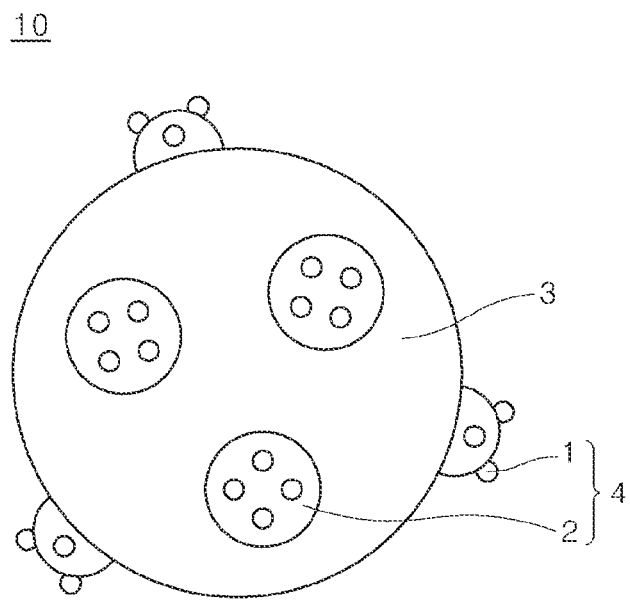

CATALYST FOR EXHAUST GAS PURIFICATION

CROSS-REFERENCE TO RELATED APPLICATION

The present application is a national stage filing under 35 U.S.C § 371 of PCT application number PCT/KR2019/000497 filed on Jan. 11, 2019, which is based upon and claims the benefit of priorities to Korean Patent Application No. 10-2018-0106724, filed on Sep. 6, 2018, in the Korean Intellectual Property Office, which are incorporated herein in their entireties by reference.

TECHNICAL FIELD

The present disclosure relates to a catalyst for purifying exhaust gas.

DESCRIPTION OF RELATED ART

Exhaust gas discharged from an internal combustion engine contains substances harmful to an environment and a human body, such as carbon monoxide (CO), hydrocarbons (THC, total hydrocarbon), and nitrogen oxides ($NO_x$). With recent rise of global environmental awareness, there is a further demand for improvement in performance of catalysts for exhaust gas treatment used to convert and discharge the above exhaust gas components into carbon dioxide, nitrogen, oxygen, and water, etc.

One of challenges related to the catalyst for treating the exhaust gas is to prevent the catalyst from aging to improve a catalyst life.

DISCLOSURE

Technical Purpose

One implementation of the present disclosure provides a catalyst for purifying exhaust gas in which catalyst aging due to noble metal aggregation is suppressed, durability thereof is secured, and catalyst performance is improved.

Technical Solution

In one implementation of the present disclosure, there is provided a catalyst for purifying exhaust gas, the catalyst containing a noble metal; alumina support particles; and $ZrO_2$ semiconductor particles deposited on a surface of each of the alumina support particles.

Technical Effects

In the catalyst for purifying the exhaust gas, the aging of the catalyst due to aggregation and growth of the noble metal may be suppressed to improve the life of the catalyst.

BRIEF DESCRIPTION OF DRAWINGS

FIG. 1 is a schematic diagram of a catalyst for purifying exhaust gas according to an implementation of the present disclosure.

DETAILED DESCRIPTIONS

Hereinafter, ab implementation of the present disclosure will be illustrated in detail. However, this implementation is presented as an example. The present disclosure is not limited thereto, and the present disclosure is only defined by a scope of the claims to be described later.

In one implementation of the present disclosure, there is provided a catalyst for purifying exhaust gas, the catalyst containing a noble metal; alumina support particles; and $ZrO_2$ semiconductor particles deposited on a surface of each of the alumina support particles.

The catalyst for purifying the exhaust gas has a novel particle structure in which $ZrO_2$ semiconductor particles are deposited on the surface of each of the alumina support particles.

The noble metal may be deposited on each of the $ZrO_2$ semiconductor particles. Herein, the $ZrO_2$ semiconductor particle having the noble metal deposited thereon is referred to as a composite nano-particle.

In the catalyst for purifying the exhaust gas, the composite nano-particles are deposited on each of the alumina support particles, especially on the surface of the alumina support particle.

In the catalyst for purifying the exhaust gas, the composite nano-particles are deposited on each of the alumina support particles. The composite nano-particle has a structure in which the noble metal is deposited on each of the $ZrO_2$ semiconductor particles. In this connection, the noble metal is deposited on each of the alumina support particles using the $ZrO_2$ semiconductor particle as an intermediate carrying medium. Thus, the catalyst for purifying the exhaust gas contains the $ZrO_2$ semiconductor particles as an intermediate carrying medium, so that the noble metals deposited on each of the $ZrO_2$ semiconductor particles may be evenly dispersed on the surface of each of the alumina support particles, in particular, may be maintained in a nanoparticle state.

When the noble metal is not deposited on the $ZrO_2$ semiconductor particle but is directly on each of the alumina support particles, the noble metal particles tend to aggregate with each other or grow due to high temperature exhaust gas produced in a high temperature environment of a vehicle. Further, a porous surface structure of the alumina support particle may be destroyed due to the high temperature exhaust gas, such that deposited noble metal particles are buried or lost, thereby reducing a surface area of a catalyst reaction.

To the contrary, when the noble metal is deposited on each of the $ZrO_2$ semiconductor particles, the aggregation and growth between the noble metal particles may be suppressed even when the catalyst is exposed to the high-temperature exhaust gas such as vehicle exhaust gas for a long time. Therefore, in the catalyst for purifying the exhaust gas, the aging of the catalyst due to the aggregation and growth of noble metals may be suppressed to improve the catalyst life. Further, the alumina support particle having the composite nano-particles deposited on the surface thereof has an advantageous structure to suppress the collapse of the surface structure in a high temperature exhaust gas environment.

Eventually, as the catalyst for purifying the exhaust gas has such a structure, the noble metal may be dispersed and may be maintained in a well dispersed state. Thus, when the catalyst acts, this structure may effectively prevent aggregation of the noble metal particles due to the high temperature environment or deterioration of performance of the catalyst due to surface structure modification of the alumina support particle.

FIG. 1 is a schematic diagram of a catalyst for purifying exhaust gas according to an implementation of the present disclosure.

In FIG. 1, catalyst 10 for purifying the exhaust gas contains the composite nano-particles 4 including the $ZrO_2$ semiconductor particles 2 and the noble metal particles 1 deposited on each of the $ZrO_2$ semiconductor particles 2. The composite nano-particles 4 are deposited on the surface of each of the alumina support particles 3.

In one implementation, the catalyst 10 for purifying the exhaust gas may contain 40 to 70 parts by weight of the $ZrO_2$ semiconductor particles 2 relative to 100 parts by weight of the alumina support particles 3. Specifically, the catalyst 10 may contain 50 to 60 parts by weight of the $ZrO_2$ semiconductor particles 2 relative to 100 parts by weight of the alumina support particles 3.

When the catalyst 10 for purifying the exhaust gas contains an excessive amount of the $ZrO_2$ semiconductor particles 2 beyond the above defined range, following problems may occur.

First, the $ZrO_2$ semiconductor particles to be deposited on the surface of each of the alumina support particles increase, such that aggregation therebetween may occur. Thus, the $ZrO_2$ semiconductor particles having the noble metal particles deposited thereon, that is, the composite nano-particles may be lost. Therefore, the catalyst performance may deteriorate.

Second, a probability at which sintering of the $ZrO_2$ semiconductor particle itself may occur increases during firing and high temperature aging. Accordingly, the catalyst performance may deteriorate.

Third, when the number of $ZrO_2$ semiconductor particles increases, the resulting catalyst becomes vulnerable to moisture such that the catalyst performance is degraded. Since the moisture is produced even when a vehicle is driving, the catalyst performance may be adversely affected. Therefore, when evaluating the performance of the catalyst for purifying exhaust gas, hydrothermal aging is carried out.

Fourth, a cost of the catalyst may increase. While the catalyst for purifying exhaust gas exhibits equivalent performance, a production cost thereof, especially a material cost should be reduced.

When the catalyst for purifying the exhaust gas contains a small amount of the $ZrO_2$ semiconductor particles below the range, the following problems may occur.

First, the effect of preventing the aggregation of the noble metal particles as described above and the modification/collapse of the porous surface structure of the alumina as described above support may not be sufficiently obtained.

Second, in order to ensure the catalyst performance by setting a total noble metal percentage in the catalyst for purifying exhaust gas to a predetermined value, as a percentage of the $ZrO_2$ semiconductor particles relative to the same mass of the alumina support decreases, a percentage of the noble metal deposited on the $ZrO_2$ semiconductor particles relative to the same mass of the alumina support should increase. In this case, a spacing between the noble metal particles deposited on each of the $ZrO_2$ semiconductor particles is smaller, so that the probability at which the noble metal particles may aggregate with each other increases, and thus the catalyst performance may be deteriorated.

Third, from the same point of view, as the percentage of the $ZrO_2$ semiconductor particles decreases, the percentage of the noble metal deposited on the $ZrO_2$ semiconductor particles should increase. However, it is relatively difficult to deposit a larger percentage of the noble metal on the $ZrO_2$ semiconductor particles. Further, when possible, a process time and cost may increase.

Specifically, the composite nano-particle 4 has a nano-on-nano structure in which nano-sized noble metal particles 1, each having a smaller size than a size of the nano-sized $ZrO_2$ semiconductor particle 2, are deposited on the surface of each of the nano-sized $ZrO_2$ semiconductor particles 2.

Each of the $ZrO_2$ semiconductor particles 2 may have an average diameter of about 10 nm to about 500 nm, and specifically, may have an average diameter of about 10 nm to about 200 nm.

A size of each of the composite nano-particles 4 may mainly depend on a size of each of the $ZrO_2$ semiconductor particles 2. Thus, the composite nano-particle 4 may have an average diameter of about 10 nm to about 500 nm, and specifically, may have an average diameter of about 10 nm to about 200 nm.

The average diameter of each of the composite nano-particles 4 and the $ZrO_2$ semiconductor particles 2 may be calculated using electron microscopic measurements such as SEM and TEM image analysis.

The noble metal 1 performs catalyst reaction for exhaust gas purification. The exhaust gas purification reaction is based on an oxidation and reduction reaction that converts exhaust gas components such as carbon monoxide (CO), hydrocarbons (THC, total hydrocarbon), and nitrogen oxides ($NO_x$) contained in the exhaust gas into carbon dioxide, nitrogen, oxygen, and water, etc. In this connection, the noble metal 1 acts as catalyst for the oxidation-reduction reaction.

The noble metal 1 may include one selected from a group consisting of, for example, ruthenium (Ru), rhodium (Rh), palladium (Pd), osmium (Os), iridium (Ir), platinum (Pt), and combinations thereof.

The noble metal 1 may be classified into a noble metal for catalyst for activation of an oxidation reaction and a noble metal for catalyst for activation of a reduction reaction, depending on a type of the exhaust gas purification reaction. For example, platinum (Pt) or palladium (Pd) may be used as the noble metal for the catalyst for activation of the oxidation reaction, and may activate the oxidation reaction that oxidizes carbon monoxide to carbon dioxide, and hydrocarbons to carbon dioxide and water.

Further, the noble metal for the catalyst for activation of the reduction reaction may include rhodium, and may activate the reaction of reducing nitrogen oxides to carbon dioxide and nitrogen.

The type of the noble metal 1 may be selected according to an application thereof. For example, platinum (Pt) which exhibits excellent activity at low temperatures may realize excellent catalyst performance in an environment in which exhaust gas of a relatively low temperature is produced, for example, in a diesel based vehicle.

Further, in particular, palladium (Pd) whose stability at high temperatures is important may exhibit excellent catalyst performance and life in environments in which high temperature exhaust gas is produced, for example, in a gasoline based vehicle.

Further, the noble metal 1 may be deposited in a form of an alloy and may exhibit excellent effects via further improved oxidation and reduction reactions.

For example, an alloy of platinum (Pt) and palladium (Pd) as the noble metal 1 may further improve the oxidation reaction activity.

Further, the noble metal 1 may include an alloy of platinum (Pt) or palladium (Pd) as the noble metal for the catalyst for activation of the oxidation reaction, and rhodium (Rh) as the noble metal for the catalyst for activation of the reduction reaction. This alloy may exhibit excellent exhaust gas treatment performance and poisoning-resistance, thereby improving the catalyst life.

Further, the composite nano-particle 4 may have a structure in which an alloy between ruthenium (Ru), osmium (Os), and iridium (Ir), and rhodium (Rh), palladium (Pd), and platinum (Pt) as the noble metal is deposited on the $ZrO_2$ semiconductor particle 2, thereby improving physical and chemical properties of the catalyst such as rigidity, durability, and poisoning-resistance.

The noble metal 1 may be, for example, a noble metal particle deposited on the $ZrO_2$ semiconductor particle 2 via a photo-deposition method. An average particle diameter thereof may be in an order of several nanometers (nm), for example, may be about 0.1 nm to about 30 nm, and specifically, may be about 1 nm to about 20 nm.

The average diameter of the noble metal particle 1 may be calculated using electron microscopy measurements such as SEM and TEM image analysis.

The particle diameter of the noble metal particle 1 is very smaller, compared to that of the $ZrO_2$ semiconductor particle 2. The noble metal particle 1 has a particle diameter in the above range. Thus, the noble metal particle 1 may be photo-deposited on the surface of each of the $ZrO_2$ semiconductor particles 2 at an appropriate content thereof and exhibit excellent catalyst activity. When using the photo-deposition method, the smaller nano-sized noble metal particles 1 may be uniformly dispersed on the surface of each of the nano-sized semiconductor particles 2.

The noble metal particles 1 may have the average particle diameter in the aforementioned range and may be evenly dispersed on each of the $ZrO_2$ semiconductor particles 2, thereby improving the catalyst action for the oxidation and reduction reactions of the exhaust gas purification reaction. Further, even in a high temperature exhaust gas environment, the growth and aggregation of the noble metal particles 1 may be greatly suppressed.

Specifically, when the average particle diameter of the noble metal particle 1 is smaller than the above range, the aggregation and growth of the noble metal particles may be accelerated due to Ostwald Ripening. However, when the diameter exceeds the range, the reaction surface area may decrease and thus exhaust gas treatment capacity may be reduced.

Therefore, in the catalyst for treating the exhaust gas containing the noble metal particles 1 having an average particle diameter in the above range, a larger surface area of catalyst activity may be maintained, thereby further improving the performance of the catalyst.

Regarding the composite nano-particle 4, the smaller nano-sized noble metal particles 1 may be deposited and uniformly dispersed on each of the nano-sized $ZrO_2$ semiconductor particles 2 at a higher content thereof via light irradiation without separate heat treatment.

Thus, a large surface area of the noble metal 1 may be secured, so that excellent catalyst performance may be realized, excellent thermal stability may be achieved, and excellent catalyst life may be realized in a high temperature environment.

The catalyst for purifying the exhaust gas contains the composite nano-particles 4 in which the noble metal 1 is not physically deposited on a carrier such as alumina according to a pore size but is deposited directly on the $ZrO_2$ semiconductor particles 2. Thus, the noble metal 1 may be deposited on the $ZrO_2$ semiconductor particles 2 via light irradiation without separate heat treatment, such that the aggregation and growth of the noble metal particles 1 in a high temperature environment may be suppressed to maintain a large surface area thereof and realize the excellent catalyst life.

For example, when irradiating light having energy greater than a bandgap energy of the $ZrO_2$ semiconductor particle 2, electrons in a valence band may be excited and transition to a conduction band, and holes may be left in the valence band, resulting in electron-hole pairs. The electrons generated in this way reduce the noble metal such that the small noble metal nanoparticles may be uniformly dispersed on the $ZrO_2$ semiconductor particles 2. Specifically, the $ZrO_2$ semiconductor particle 2 may have a band gap of about 0.5 eV to about 10.0 eV. Regarding the composite nano-particle 4, the noble metal 1 may be deposited on the $ZrO_2$ semiconductor particles 2 by irradiating light of about 4.0 eV to about 6.5 eV thereto.

The catalyst 10 for purifying the exhaust gas may contain the noble metal 1 in a content of about 1 part by weight to about 50 parts by weight based on 100 parts by weight of the $ZrO_2$ semiconductor particles. For example, the noble metal may be contained in a content of about 1 part by weight to about 32 parts by weight based on 100 parts by weight of solid semiconductor nanoparticles.

The catalyst 10 for purifying the exhaust gas may be controlled to have a predetermined content of the noble metal 1, based on a content ratio between the alumina support particles 3 and the $ZrO_2$ semiconductor particles 2 and a content ratio between the $ZrO_2$ semiconductor particles 2 and the noble metal 1, as described above, and may participate in oxidation and reduction reactions, thereby exhibiting remarkably improved exhaust gas treatment performance, compared to the same content of the noble metal 1. Further, even in a high temperature exhaust gas environment, growth, aggregation, burial and internal diffusion of the noble metal may be considerably suppressed, such that while thermal durability of the catalyst is ensured, the catalyst may exhibit excellent catalyst life even in a small content of the noble metal.

The catalyst 10 for purifying the exhaust gas contains the alumina support particles 3, and thus has a large surface area, and is more reliably involved in oxidation and reduction reactions to treat the exhaust gas.

Each of the alumina support particles 3 may have an average particle diameter of about 0.5 μm to about 50 μm. More specifically, each of the alumina support particles 3 may have an average particle diameter of about 0.5 μm to about 10 μm.

The average diameter of the alumina support particles 3 may be calculated using electron microscopy measurements such as SEM and TEM image analysis.

The alumina support particles 3 may act as a support that supports thereon the composite nano-particles 4, that is, the $ZrO_2$ semiconductor particles 2 having the noble metal particles 1 deposited thereon, and imparts thermal stability thereto. Thus, the alumina support particles 3 may act as a support that supports the composite nano-particles 4 reliably even in a high temperature environment.

The catalyst 10 for purifying the exhaust gas contains the alumina support particles 3 so that the composite nano-particles 4 may be effectively dispersed. As a result, the noble metal particles 1 may be effectively dispersed. Further, the aggregation and growth of the noble metal particles 1 may be suppressed such that the well dispersed state of the noble metal particles 1 is maintained even in a high-temperature exhaust gas environment, thereby further improving the catalyst life.

Each of the alumina support particles 3 may include an aluminum oxide ($Al_2O_3$).

Each of the alumina support particles 3 may have a porous structure having pores. However, because the diameter of the composite nano-particle 4 is larger than an average diameter of the pores defined in the surface of each of the alumina support particles 3, the composite nano-particles 4 are deposited in the surface of each of the alumina support particles 3, and are not deposited on the pores (see FIG. 1).

Specifically, the average diameter of the pores defined in the surface of each of the alumina support particles 3 may be 10 nm or smaller.

Since the composite nano-particles 4 is deposited on the surface of each of the alumina support particles 3, the noble metal particles 1 of the composite nano-particles 4 may be dispersed on the surface of each of the alumina support particles 3. The noble metal particles dispersed in the inner pores of the alumina support particles 3 may easily aggregate or grow with each other in a high temperature exhaust gas environment. However, the noble metal particles 1 of the composite nano-particles 4 deposited on the surface of each of the alumina support particles 3 may be significantly prevented from the aggregation and growth thereof.

In one implementation, the noble metal 1 contained in the composite nano-particles 4 may account for at least 90% by weight of a total noble metal 1 contained in the catalyst 10 for purifying the exhaust gas. In other words, the catalyst 10 for purifying the exhaust gas may have very low or no content of the noble metal deposited in the inner pores of the alumina support particles 3. Specifically, the content of the noble metal deposited in the inner pores of the alumina support particles 3 may be smaller than 10% by weight of the total noble metal content contained in the catalyst 10 for purifying the exhaust gas.

The catalyst 10 for purifying the exhaust gas may activate oxidation and reduction reactions without separate treatment, for example, without light irradiation. Specifically, the catalyst 10 for purifying the exhaust gas is involved in the oxidation and reduction reactions as follows in order to have activity as a catalyst, without separate UV light irradiation, such that carbon monoxide (CO), hydrocarbons (THC, total hydrocarbon), and nitrogen oxides ($NO_x$) contained in the exhaust gas may be converted into carbon dioxide, nitrogen, oxygen, and water, etc.

i) Oxidation reaction of carbon monoxide: $CO+O_2=>CO_2$
ii) Oxidation reaction of hydrocarbon: $C_xH_{2x+2}+O_2=>CO_2+H_2O$
iii) Reduction reaction of nitrogen oxide: $NO+CO=>CO_2+N_2$ Hereinafter, a method for preparing the catalyst 10 for purifying the exhaust gas will be described. The catalyst 10 for purifying the exhaust gas may be prepared by a method including mixing a noble metal precursor with a suspension containing $ZrO_2$ semiconductor particles 2 to produce a mixture; irradiating light to the mixture to prepare composite nano-particles 4 including $ZrO_2$ semiconductor particles 2 having the noble metal 1 deposited thereon; mixing the composite nano-particles 4 with alumina support particles 3 to prepare an aqueous composition; and drying and firing the aqueous composition to prepare the catalyst 10 for purifying the exhaust gas.

Specifically, the $ZrO_2$ semiconductor particles 2 may be contained in a content of about 0.1 wt % to about 50 wt % in the suspension. For example, the $ZrO_2$ semiconductor particles 2 may be contained in a content of about 0.5 wt % to about 20 wt %. When the content of the $ZrO_2$ semiconductor particles 2 is smaller than the above range, it is difficult to secure the $ZrO_2$ semiconductor particles 2 on which a sufficient amount of the noble metal is deposited, and accordingly, the number of production processes increases and a production cost increases. In addition, when the content exceeds the above range, the irradiated light may not pass through the suspension containing the $ZrO_2$ semiconductor particles 2, such that the photoreaction may not be sufficiently performed and a shape and a distribution of the noble metal particles may not be adjusted reliably.

The noble metal precursor may include one selected from a group consisting of $PtCl_2$, $H_2PtCl_6$, $PdCl_2$, $Na_2PdCl_4$, $K_2PdCl_4$, $H_2PdCl_4$, $RhCl_3$, $Na_3RhCl_6$, $K_3RhCl_6$, $H_3RhCl_6$ and combinations thereof.

For example, the noble metal precursor may include Pt precursors such as $PtCl_2$, $H_2PtCl_6$, Pd precursors such as $PdCl_2$, $Na_2PdCl_4$, $K_2PdCl_4$, $H_2PdCl_4$, or Rh precursors such as $RhCl_3$, $Na_3RhCl_6$, $K_3RhCl_6$, $H_3RhCl_6$, etc.

The mixture may further contain a sacrificial agent. The sacrificial agent may remove holes produced in the $ZrO_2$ semiconductor particles 2 via the light irradiation, so that electrons produced in the $ZrO_2$ semiconductor particles 2 may efficiently reduce the noble metal. Accordingly, the activity of the catalyst may be increased.

The sacrificial agent may be contained in a content of about 0.1 parts by weight to about 50 parts by weight based on 100 parts by weight of the mixture of the noble metal precursor mixture with the suspension containing the $ZrO_2$ semiconductor particles 2. Specifically, when the content of the sacrificial agent is smaller than the above range, the noble metal may not be sufficiently reduced. When the content exceeds the above range, the reduction of the noble metal may not be controlled and a particle diameter distribution and a dispersion of the noble metal become non-uniform. Most of types of the sacrificial agent is harmful to an environment and thus use thereof is limited.

The sacrificial agent may include one selected from a group consisting of methanol, ethanol, isopropanol, formic acid, acetic acid, and combinations thereof.

The mixture is irradiated with light to prepare the composite nano-particles 4 including the $ZrO_2$ semiconductor particles 2 having the noble metal deposited thereon. As described above, in the catalyst 10 for purifying the exhaust gas, the noble metal particles 1 as the small nanoparticles may be uniformly dispersed on each of the $ZrO_2$ semiconductor particles 2 via the light irradiation without separate heat treatment. For example, the light may be irradiated for about 0.5 hours to about 10 hours.

The aqueous composition may be prepared by mixing the alumina support particles 3 with the composite nano-particles 4 obtained as described above.

The aqueous composition may be dried and then fired under a temperature condition of about 300° C. to about 700° C.

Using the above preparation method, the smaller nano size noble metal particles 1 may be uniformly dispersed on the $ZrO_2$ semiconductor particles 2.

One implementation of the present disclosure provides a method for treating exhaust gas from a vehicle using the catalyst 10 to purify the exhaust gas.

The catalyst 10 for purifying the exhaust gas may activate the oxidation and reduction reactions without separate treatment, for example, without light irradiation. Specifically, catalyst 10 for purifying the exhaust gas is involved in the oxidation and reduction reactions to have activity as a catalyst without separate UV light irradiation, such that carbon monoxide (CO) and hydrocarbons (THC, total hydrocarbon) and nitrogen oxides ($NO_x$) may be converted into carbon dioxide, nitrogen, oxygen, and water.

In addition, in the catalyst 10 for purifying the exhaust gas, the growth, aggregation, burial, and internal diffusion of the noble metal particles may be greatly suppressed even in a high-temperature exhaust gas environment. Thus, while the catalyst 10 for purifying the exhaust gas may contain a small content of the noble metal, the catalyst 10 for purifying the exhaust gas exhibit excellent catalyst life.

For example, even after the catalyst 10 for purifying the exhaust gas is subject to an aging treatment at a high temperature of about 750° C. for about 24 hours, the diameter of the noble metal particles contained in the catalyst particles may be kept in a range from about 1 nm to about 80 nm.

Hereinafter, Examples and Comparative Examples of the present disclosure are described. Such Examples are only embodiments of the present disclosure, and the present disclosure is not limited to the Examples.

EXAMPLES

Example 1

Zirconia ($ZrO_2$) powders (average particle diameter 30 nm obtained using TEM image analysis) were dispersed in water to prepare a 0.5 wt % suspension. While continuously stirring the zirconia suspension, a $Na_2PdCl_4$ precursor was mixed therewith while adjusting a content of the precursor so that a content of Pd was 6 parts by weight relative to 100 parts by weight of solid zirconia. Then, the mixture was stirred for 10 minutes. Methyl alcohol as the sacrificial agent was added to the mixture in an amount of 10 parts by weight relative to 100 parts by weight of the mixture of the $Na_2PdCl_4$ precursor with the suspension containing zirconia. Then, the mixture was further stirred continuously. Thereafter, the mixture containing zirconia and the Pd precursor was continuously stirred and irradiated with ultraviolet rays for about 2 hours to perform light irradiation. The mixture subject to the light irradiation was dried to prepare the composite nano-particles including the $ZrO_2$ semiconductor particles on which Pd was deposited.

The average particle diameter of the Pd particles deposited on the composite nano-particles as obtained using TEM image analysis was 3 nm.

Further, the alumina support particles ($Al_2O_3$, an average particle diameter of 5 μm as obtained using TEM image analysis) were prepared.

The obtained composite nano-particles and the alumina support particles were mixed with each other to prepare the aqueous composition which in turn was dried, and fired at 500° C. to prepare the catalyst for purifying exhaust gas. A mixing ratio of the composite nano-particles and the alumina support particles was adjusted using ICP (Inductively Coupled Plasma) so that the content of Pd particles in the finally obtained catalyst for purifying the exhaust gas was 2 wt %.

A mass ratio of the $ZrO_2$ semiconductor particles and the alumina support particles for the thus obtained catalyst for purifying the exhaust gas was measured using ICP (Inductively Coupled Plasma). The measurement result was that 52 parts by weight of the $ZrO_2$ semiconductor particles was relative to 100 parts by weight of the alumina support particle.

Example 2

Composite nano-particles were prepared using the same manner as in Example 1, except that when preparing the composite nano-particles, the content of Pd was 12 parts by weight relative to 100 parts by weight of solid zirconia (that is, a Pd deposition amount was increased).

Subsequently, the same alumina support particles as in Example 1 was mixed with the composite nano-particles. Then, a catalyst for purifying exhaust gas was prepared in the same manner as in Example 1. In this connection, the mixing ratio of the composite nano-particles and the alumina support particles was adjusted using ICP (Inductively Coupled Plasma) so that the content of Pd particles in the finally prepared catalyst for purification of the exhaust gas was 2 wt %.

A mass ratio of the $ZrO_2$ semiconductor particles and the alumina support particles for the thus obtained catalyst for purifying the exhaust gas was measured using ICP (Inductively Coupled Plasma). The measurement result was that 20 parts by weight of the $ZrO_2$ semiconductor particles was relative to 100 parts by weight of the alumina support particle.

Example 3

Composite nano-particles were prepared using the same manner as in Example 1, except that when preparing the composite nano-particles, the content of Pd was 4 parts by weight relative to 100 parts by weight of solid zirconia (that is, a Pd deposition amount was decreased).

Subsequently, the same alumina support particles as in Example 1 was mixed with the composite nano-particles. Then, a catalyst for purifying exhaust gas was prepared in the same manner as in Example 1. In this connection, the mixing ratio of the composite nano-particles and the alumina support particles was adjusted using ICP (Inductively Coupled Plasma) so that the content of Pd particles in the finally prepared catalyst for purification of the exhaust gas was 2 wt %.

A mass ratio of the $ZrO_2$ semiconductor particles and the alumina support particles for the thus obtained catalyst for purifying the exhaust gas was measured using ICP (Inductively Coupled Plasma). The measurement result was that 104 parts by weight of the $ZrO_2$ semiconductor particles was relative to 100 parts by weight of the alumina support particle.

Example 4

Zirconia ($ZrO_2$) powders (average particle diameter 30 nm obtained using TEM image analysis) were dispersed in water to prepare a 0.5 wt % suspension. While continuously stirring the zirconia suspension, a $H_2PtCl_6$ precursor was mixed therewith while adjusting a content of the precursor so that a content of Pt was 6 parts by weight relative to 100 parts by weight of solid zirconia. Then, the mixture was stirred for 10 minutes. Methyl alcohol as the sacrificial agent was added to the mixture in an amount of 10 parts by weight relative to 100 parts by weight of the mixture of the $H_2PtCl_6$ precursor with the suspension containing zirconia. Then, the mixture was further stirred continuously. Thereafter, the mixture containing zirconia and the Pt precursor was continuously stirred and irradiated with ultraviolet rays for about 2 hours to perform light irradiation. The mixture subject to the light irradiation was dried to prepare the composite nano-particles including the $ZrO_2$ semiconductor particles on which Pd was deposited.

The average particle diameter of the Pt particles deposited on the composite nano-particles as obtained using TEM image analysis was 3 nm.

Further, the alumina support particles ($Al_2O_3$, an average particle diameter of 5 μm as obtained using TEM image analysis) were prepared.

The obtained composite nano-particles and the alumina support particles were mixed with each other to prepare the aqueous composition which in turn was dried, and fired at 500° C. to prepare the catalyst for purifying exhaust gas. A mixing ratio of the composite nano-particles and the alumina support particles was adjusted using ICP (Inductively Coupled Plasma) so that the content of Pt particles in the finally obtained catalyst for purifying the exhaust gas was 2 wt %.

A mass ratio of the $ZrO_2$ semiconductor particles and the alumina support particles for the thus obtained catalyst for purifying the exhaust gas was measured using ICP (Inductively Coupled Plasma). The measurement result was that 52 parts by weight of the $ZrO_2$ semiconductor particles was relative to 100 parts by weight of the alumina support particle.

Example 5

Composite nano-particles were prepared using the same manner as in Example 1, except that when preparing the composite nano-particles, the content of Pt was 4 parts by weight relative to 100 parts by weight of solid zirconia (that is, a Pt deposition amount was decreased).

Subsequently, the same alumina support particles as in Example 4 was mixed with the composite nano-particles. Then, a catalyst for purifying exhaust gas was prepared in the same manner as in Example 4. In this connection, the mixing ratio of the composite nano-particles and the alumina support particles was adjusted using ICP (Inductively Coupled Plasma) so that the content of Pt particles in the finally prepared catalyst for purification of the exhaust gas was 2 wt %.

A mass ratio of the $ZrO_2$ semiconductor particles and the alumina support particles for the thus obtained catalyst for purifying the exhaust gas was measured using ICP (Inductively Coupled Plasma). The measurement result was that 104 parts by weight of the $ZrO_2$ semiconductor particles was relative to 100 parts by weight of the alumina support particle.

Comparative Example 1

An aqueous solution was prepared by dispersing alumina support particles ($Al_2O_3$, average particle diameter of 5 μm obtained using TEM image analysis) in water. While continuously stirring the aqueous solution, $Na_2PdCl_4$ precursor was added thereto so that a content of Pd was 2.1 parts by weight relative to 97.9 parts by weight of solid $Al_2O_3$. The $Al_2O_3$ aqueous solution containing the Pd precursor was stirred for 2 hours at a temperature of 60° C. After the stirring was completed, the aqueous solution was dried at 80° C. for 24 hours and fired at 550° C. for 2 hours to prepare a catalyst for purifying exhaust gas as $Al_2O_3$ particles on which Pd was deposited. When measuring a content of Pd in the thus obtained catalyst for purifying the exhaust gas using ICP (Inductively Coupled Plasma), the content of Pd was 2 wt %.

Comparative Example 2

An aqueous solution was prepared by dispersing alumina support particles ($Al_2O_3$, average particle diameter of 5 μm obtained using TEM image analysis) in water. While continuously stirring the aqueous solution, $H_2PtCl_6$ precursor was added thereto so that a content of Pt was 2.4 parts by weight relative to 97.6 parts by weight of solid $Al_2O_3$. The $Al_2O_3$ aqueous solution containing the Pd precursor was stirred for 2 hours at a temperature of 60° C. After the stirring was completed, the aqueous solution was dried at 80° C. for 24 hours and fired at 550° C. for 2 hours to prepare a catalyst for purifying exhaust gas as $Al_2O_3$ particles on which Pt was deposited. When measuring a content of Pt in the thus obtained catalyst for purifying the exhaust gas using ICP (Inductively Coupled Plasma), the content of Pt was 2 wt %.

Evaluation

Experimental Example 1: Evaluating Purification Performance

In order to evaluate the exhaust gas treatment performance of each of the exhaust gas treatment catalysts of Examples 1 to 5 and Comparative Examples 1 to 2, the treatment performance was evaluated using an vehicle exhaust gas purification performance evaluation apparatus (Gas Chromatograph Analyzer, ABB Ltd.). For the catalyst for exhaust gas treatment in each of Examples 1 to 5 and Comparative Examples 1 to 2, Light Off Temperature (LOT evaluation) of an oxidation reaction ($CO+O_2 \rightarrow CO_2$) of carbon monoxide was performed at a reaction temperature of about 50° C. to about 500° C. under a condition of 1000 ppm carbon monoxide in a total flow rate of 5 L/min (nitrogen balance). LOT (° C.) refers to a temperature as measured when a purification percentage reaches 50%. Thus, the catalyst having a lower LOT value has better purification performance.

Specifically, an evaluation method is as follows.

A catalyst sample to be evaluated contained the same amount of noble metal (2 wt % Pt), was processed into a pellet (size: 600 μm to 1000 μm), and was tested and evaluated. In the reaction for evaluating the purification performance, the reaction temperature was increased from 50° C. to 500° C. at a rate of 10° C./min. In this connection, 5000 cc/min of similar exhaust gases containing CO were injected, and a gas concentration (typically of CO) was detected in real time using an infrared photometer. Components of the injected are shown in Table 1 below.

TABLE 1

| Gas components | | | | | | |
|---|---|---|---|---|---|---|
| $N_2$ | $O_2$ | $H_2O$ | $CO_2$ | CO | $C_3H_6, C_3H_8$ | NO |
| Balance | 5 wt % | 10 wt % | 5 wt % | 1000 ppm | 1000 ppm | 150 ppm |

LOT measurements are shown in Tables 2 and 3.

TABLE 2

| Examples | Content of $ZrO_2$ semiconductor particles relative to 100 parts by weight of alumina support particles (parts by weight) | Pd deposition amount relative to 100 parts by weight of $ZrO_2$ semiconductor particles in composite nanoparticles (parts by weight) | LOT (° C.) |
|---|---|---|---|
| Example 1 | 52 | 6 | 235 |
| Example 2 | 20 | 12 | 247 |
| Example 3 | 104 | 4 | 264 |
| Comparative Example 1 | — | — | 270 |

A Pd deposition amount (parts by weight) was determined relative to 100 parts by weight of $ZrO_2$ semiconductor particles in the composite nano-particles of Table 2 such that a content of $ZrO_2$ semiconductor particles in the catalysts for purifying exhaust gas in Examples 1 to 3 and Comparative Example 1 varied while the content of Pd in the catalysts for purifying exhaust gas was substantially constant.

TABLE 3

| Examples | Content of $ZrO_2$ semiconductor particles relative to 100 parts by weight of alumina support particles (parts by weight) | Pt deposition amount relative to 100 parts by weight of $ZrO_2$ semiconductor particles in composite nanoparticles (parts by weight) | LOT (° C.) |
|---|---|---|---|
| Example 4 | 52 | 6 | 360 |
| Example 5 | 104 | 4 | 384 |
| Comparative Example 2 | — | — | 401 |

A Pt deposition amount (parts by weight) was determined relative to 100 parts by weight of $ZrO_2$ semiconductor particles in the composite nano-particles of Table 3 such that a content of $ZrO_2$ semiconductor particles in the catalysts for purifying exhaust gas in Examples 4 to 5 and Comparative Example 2 varied while the content of Pt in the catalysts for purifying exhaust gas was substantially constant.

Experimental Example 2: Assessing Vulnerability to Moisture

The purification performance of the catalyst for purifying exhaust gas was evaluated using the same manner as in Experimental Example 1, except that 10 wt % of moisture was added in the evaluation condition, compared to Experimental Example 1. The 10 wt % moisture was injected together with other exhaust gas-like components in a form of steam by evaporating water input using a pump and a mass flow controller to a temperature of 350° C. The evaluation results are shown in Table 4 below.

TABLE 4

| Examples | LOT(° C.) |
|---|---|
| Example 1 | 240 |
| Example 2 | 261 |
| Example 3 | 278 |
| Example 4 | 366 |
| Example 5 | 397 |
| Comparative Example 1 | 288 |
| Comparative Example 2 | 427 |

Although the preferred examples of the present disclosure have been described in detail above, the scope of the present disclosure is not limited thereto. Various modifications and improvements as made by those skilled in the art using the basic concept of the present disclosure defined in the following claims belong to the scope of the present disclosure.

REFERENCE NUMERALS

1: Noble metal
2: $ZrO_2$ semiconductor particles
3: Alumina support particles
4: Composite nano-particles
10: Catalyst for purification of exhaust gas

What is claimed is:

1. A catalyst for purifying exhaust gas, the catalyst comprising:
a noble metal;
alumina support particles; and
$ZrO_2$ semiconductor particles deposited on a surface of each of the alumina support particles,
wherein the catalyst comprises
40 to 70 parts by weight of the $ZrO_2$ semiconductor particles relative to 100 parts by weight of the alumina support particles, and
100 parts by weight of the $ZrO_2$ semiconductor particles and 1 to 50 parts by weight of the noble metal,
wherein the catalyst for purifying the exhaust gas comprises composite nano-particles, wherein the composite nano-particles are the $ZrO_2$ semiconductor particles having the noble metal deposited thereon,
the composite nano-particles are deposited on each the surface of the alumina support particles,
the noble metal is deposited and formed on the $ZrO_2$ semiconductor particles by a photo-deposition method, and
the noble metal comprised in the composite nano-particles amounts to at least 90% by weight of a total noble metal comprised in the catalyst for purifying the exhaust gas.

2. The catalyst of claim 1, wherein a diameter of each of the composite nano-particles is larger than an average diameter of pores defined in the surface of each of the alumina support particles.

3. The catalyst of claim 1, wherein the composite nano-particle has an average diameter of 10 nm to 500 nm.

4. The catalyst of claim 1, wherein the alumina support particle has an average diameter of 0.5 μm to 50 μm.

5. The catalyst of claim 1, wherein the noble metal comprises one selected from a group consisting of ruthenium (Ru), rhodium (Rh), palladium (Pd), osmium (Os), iridium (Ir), platinum (Pt), and combinations thereof.

* * * * *